(12) United States Patent
Biazetti et al.

(10) Patent No.: US 8,819,771 B2
(45) Date of Patent: *Aug. 26, 2014

(54) AUTOMATIC GENERATION OF USER ACCOUNT POLICIES BASED ON CONFIGURATION MANAGEMENT DATABASE INFORMATION

(71) Applicant: International Business Machines Corporation, Armonk, NY (US)

(72) Inventors: Ana C. Biazetti, Cary, NC (US); Jeffrey T. Robke, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,766

(22) Filed: Nov. 27, 2012

(65) Prior Publication Data

US 2013/0086260 A1 Apr. 4, 2013

Related U.S. Application Data

(63) Continuation of application No. 13/179,701, filed on Jul. 11, 2011.

(51) Int. Cl.
*G06F 17/00* (2006.01)
*H04L 29/06* (2006.01)

(52) U.S. Cl.
USPC .............................................................. 726/1

(58) Field of Classification Search
CPC .................. H04L 41/0843; H04L 41/5048
USPC ...................................................... 726/1–21
See application file for complete search history.

(56) References Cited

U.S. PATENT DOCUMENTS

| | | | |
|---|---|---|---|
| 2005/0257244 A1* | 11/2005 | Joly et al. | 726/1 |
| 2006/0236382 A1* | 10/2006 | Hinton et al. | 726/8 |
| 2007/0011331 A1 | 1/2007 | Morimoto et al. | |
| 2008/0117869 A1 | 5/2008 | Freen et al. | |
| 2009/0327630 A1 | 12/2009 | Akamatsu et al. | |
| 2010/0106821 A1 | 4/2010 | Akiyama et al. | |
| 2010/0154024 A1* | 6/2010 | Boxmeyer et al. | 726/1 |
| 2010/0169860 A1* | 7/2010 | Biazetti et al. | 717/107 |
| 2010/0235844 A1 | 9/2010 | Arwe et al. | |
| 2011/0029767 A1 | 2/2011 | Ayachitula et al. | |

FOREIGN PATENT DOCUMENTS

| | | |
|---|---|---|
| WO | WO 2006/057337 A1 | 6/2006 |
| WO | WO 2010/060478 A1 | 6/2010 |

OTHER PUBLICATIONS

USPTO U.S. Appl. No. 13/179,701, Image File Wrapper printed from PAIR, Nov. 27, 2012, 1 page.

* cited by examiner

*Primary Examiner* — Andrew Nalven
*Assistant Examiner* — Khang Do
(74) *Attorney, Agent, or Firm* — Stephen J. Walder, Jr.; Jeffrey S. LaBaw (57) ABSTRACT

Mechanisms are provided for generating user account policies for generating user accounts to access resources of the data processing system. A determination is made that a user account policy for an identified resource in the data processing system is to be generated. Configuration information associated with the identified resource is retrieved from a configuration information database. A predefined user account policy template is retrieved from a user account policy template database system. A user account policy data structure is generated based on the retrieved configuration information and the retrieved predefined user account policy template.

11 Claims, 6 Drawing Sheets

AUTOMATIC GENERATION OF USER ACCOUNT POLICIES BASED ON CONFIGURATION MANAGEMENT DATABASE INFORMATION

This application is a continuation of application Ser. No. 13/179,701, filed Jul. 11, 2011, status pending.

BACKGROUND

The present application relates generally to an improved data processing apparatus and method and more specifically to mechanisms for automatically generating user account policies based on configuration management database information.

User account creation and management are important requirements in most large organization information technology environments. User account management solutions are typically configured through user account policies which include the definition of the requirements for requesting and maintaining an account on computer systems or networks, requirements for user information and passwords, and further define the entitlements of the account.

These user accounts and user account policies, in today's computing environments, are still manually created by a system administrator. Thus, when setting up user accounts to access composite applications or services, i.e. applications or services that are comprised of a heterogeneous collection of applications or services on one or more data processing devices, system administrators are faced with a challenge of understanding all their infrastructure components, e.g., server, storage, network applications, and the like, and their operational dependencies. This further requires the system administrator to have a deep knowledge of user account management tools and how to configure these to enable cost efficient and valuable user account configurations.

SUMMARY

In one illustrative embodiment, a method, in a data processing device, is provided for generating user account policies for generating user accounts to access resources of a data processing system. The method comprises determining that a user account policy for an identified resource in the data processing system is to be generated. The method further comprises retrieving configuration information associated with the identified resource from a configuration information database. The method also comprises retrieving a predefined user account policy template from a user account policy template database system. Moreover, the method comprises generating a user account policy data structure based on the retrieved configuration information and the retrieved predefined user account policy template.

In other illustrative embodiments, a computer program product comprising a computer useable or readable storage medium having a computer readable program with program instructions stored thereon is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for automatic generation of user account policies based on configuration information in a configuration information storage device/system, such as configuration management database (CMDB) information stored in a CMDB. That is, the mechanisms of the illustrative embodiments dynamically generate user account policies for applications based on configuration and relationship information stored in a CMDB which is mapped to one or more user account templates in order to construct the final user account policy. The illustrative embodiments further provide mechanisms for using the generated user account policy by a system administrator to provision resources such that the user accounts can actually be deployed in the IT environment.

In one illustrative embodiment, the user account policy is generated by combining the concept of discovering deployed information technology resources with the instantiation of best practices user account templates. In other words, the illustrative embodiments combine the knowledge of what actually exists in the information technology environment, such as may be specified in a CMDB, and a model, e.g., a user account template, that specifies how the user accounts should be defined.

Thus, the illustrative embodiments provide mechanisms for mapping formal user account templates representing the best practices to real discovered data, such as obtained from a CMDB. The mechanisms of the illustrative embodiments further leverage the value of already discovered topologies in the CMDB which avoids redundant and out of synchronization configurations. Moreover, the illustrative embodiments enable a feedback loop into the account management system when changes to the application are discovered by the CMDB mechanisms, such that existent user account policies can be dynamically updated accordingly. In summary, the illustrative embodiments provide a dynamic and cost efficient setup and configuration of user account environments.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
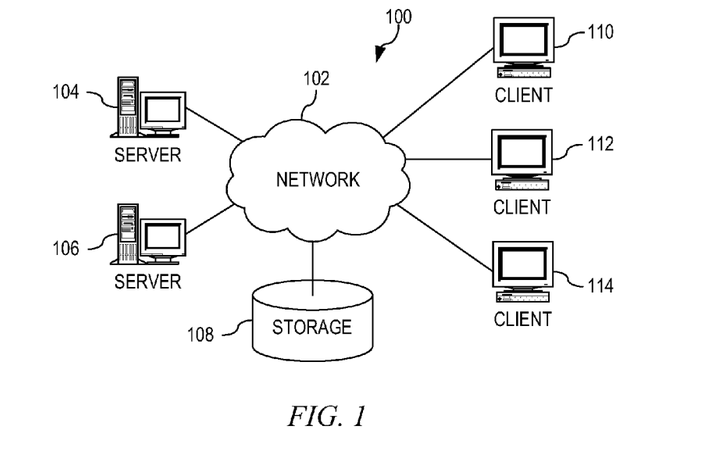
FIG. 1 is an example diagram of an example distributed data processing system in which aspects of the illustrative embodiments may be implemented.
Figure 2:
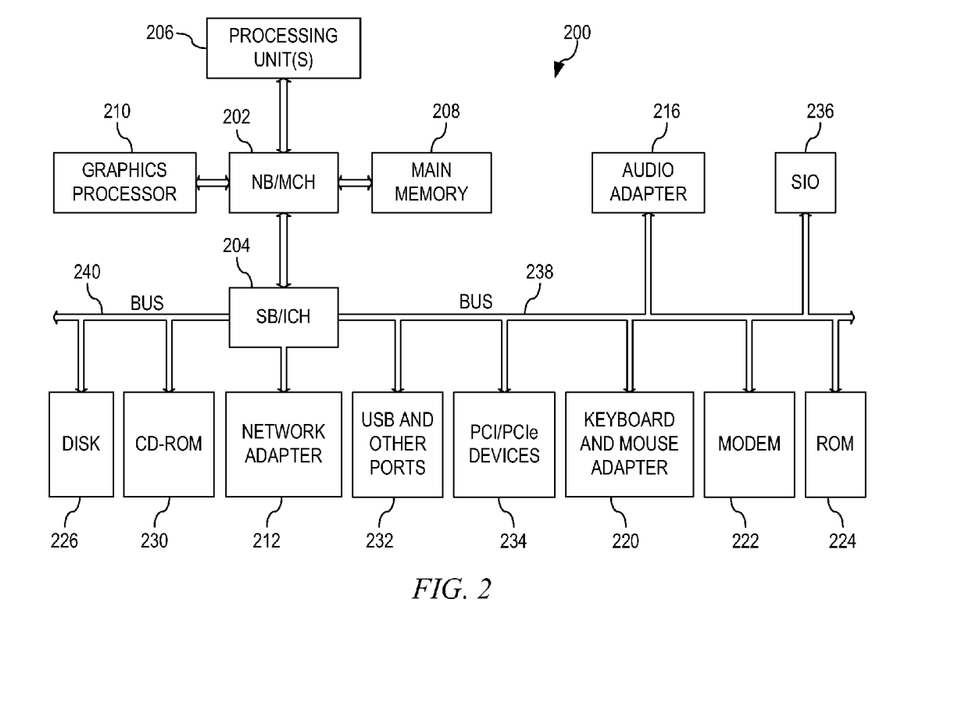
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With reference again to FIG. 1, in accordance with the illustrative embodiments, one or more of the servers 104, 106 or a separate computing device/system not shown in FIG. 1, provides a user account policy generator as described hereafter for automatically generating user account policies and implementing those policies to generate user accounts for one or more services/resources of the data processing system 100 or another data processing system (not shown). For example, a data processing device 200 as shown in FIG. 2 may be used to provide hardware and software executed on this hardware for implementing the mechanisms of the illustrative embodiments with regard to automatic generation of user account policies and user accounts based on thes user account policies. As such, the distributed data processing system 100 in FIG. 1 may represent, in one illustrative embodiment, the information technology (IT) environment for which a user account policy/user account is to be generated based on CMDB information describing IT resources of the data processing system 100. In another illustrative embodiment, the data processing device 200 may be implemented as part of the data processing system 100 and thus, the data processing system 100 may be considered to be the implementor of the mechanisms of the illustrative embodiments by providing the hardware and/or software for implementing these mechanisms in one or more of the devices shown in FIG. 1. In still another illustrative embodiment, the data processing system 100 may provide both the implementor of the mechanisms of the illustrative embodiments and the IT environment for which the mechanisms of the illustrative embodiments are automatically generating user account policies and user accounts.

For ease of explanation, it is assumed in the examples of the following description that distributed data processing system 100 is an example of a system that provides the IT environment for which user account policies and user accounts are automatically generated and the data processing system 200 in FIG. 2 is an example of one type of device for providing the hardware/software for implementing the mechanisms of the illustrative embodiments. As such, in these examples, the data processing system 200 provides a user account policy generator as described hereafter. It should be appreciated that this is only an example and many modifications may be made to the IT environment, distributed data processing system 100, and/or data processing system 200 without departing from the spirit and scope of the illustrative embodiments. For example, rather than the IT environment being provided in a distributed data processing system, the IT environment may even be a single computing device or a small number of computing devices. Moreover, rather than a single data processing system 200 providing the mechanisms for implementing a user account policy generator in accordance with the illustrative embodiments, a plurality of data processing systems may be used to implement these mechanisms, e.g., portions of these mechanisms may be provided on each of a plurality of different data processing systems and/or computing devices.

The user account policy generator utilizes information technology (IT) resource information and their dependencies as related to applications or services from a configuration management database (CMDB), such as may be provided in network attached storage system 108, server 104 or 106, or the like. The user account policy generator utilizes one or more user account templates to which information from the CMDB is mapped so as to generate a user account policy.

In the context of the present description, a user account is a data structure that stores the information that needs to exist in a user registry in order to give a user access to a given application. A user account typically includes information such as username, password, and access rights (read, write, execute) on specific services/resources of an application. For example, in one implementation of one illustrative embodiment, a user account may comprise attribute-value pairs, such as the following example attribute-value pairs: user: Bob, password: temp123, access rights: can read contents of top Patient Records Application website; can read only own patient records; can write only to own profile.

A user account policy is a policy/document data structure that describes how user accounts for a given application are to be created/provisioned and maintained. A user account policy combines information from multiple subcomponents of a given application. User Account Policies can be used by existent User Identity tools, such as Tivoli™ Identity Manager, available from International Business Machines ("IBM") Corporation of Armonk, N.Y., to automatically provision/manage users.

A user account policy template is a template data structure with generic user account information for a specific type of service/resource. For instance, one example user account policy template may be for a resource-type=Healthcare Regulator and another example user account policy template may be for a resource-type=LDAP Repository, where the LDAP repository is a user directory adhering to the Lightweight Directory Access Protocol (LDAP).

Multiple user account templates for different types of services/resources may be combined to produce one user account policy for a complex application with multiple components. For example, using the two example user account policy templates above, these templates may be combined and mapped with CMDB information into an actual user account policy.

The CMDB information is actual or real instance information representing discovered services/resources in a data processing system or information technology environment. For a Health Care company, for example, the CMDB may contain information about all its business applications, including a Patient Records application, Payments application, Claims application, and the like. The CMDB may also include details/relationships/dependencies between these applications and the various other hardware/software components of the data processing system or information technology environment, i.e. dependencies between resources of the data processing system or IT environment. For example, the Patient Records application may depend on a Web Server A, a DB B and a User Directory (LDAP) C. For each of these subcomponents, in accordance with the illustrative embodiments, more detailed information may be discovered and available on the CMDB which can be helpful in mapping to the user account templates for each subcomponent, and in building the final user account policy for the Patient Records application.

The user account policy, once generated using the mechanisms of the illustrative embodiments, may be utilized by a computing device, such as data processing system 200 in FIG.

2, for example, to provision user accounts for accessing the various data processing system or information technology environment resources, such as may be provided in system 100. The generation of user account policies may be performed automatically, for example, in response to a system administrator or other user requesting that user account policies be generated for a particular IT resource, e.g., a particular application, service, or other IT resource.

One of the primary components of the illustrative embodiments is the configuration management database (CMDB) with which the user account policy generator operates to automatically generate user account policies. CMDB mechanisms are generally known in the art and any of a variety of CMDB mechanisms may be used with the mechanisms of the illustrative embodiments without departing from the spirit and scope of the illustrative embodiments. Examples of known CMDB mechanisms with which the illustrative embodiments may be implemented are described in U.S. Patent Application Publication Nos. 2009/0327630, 2010/0106821, 2010/0235844, and 2011/0029767.

The CMDB is a repository of information related to all the components of an information technology system, the information representing the authorized configuration of the significant components of the information system environment. A CMDB helps an organization understand the relationships between these components and track their configuration thereby providing configuration management capabilities. As used herein, the term "configuration management" refers to a service support process that recognizes configuration items ("CI") that are targets of IT service management. Configuration management may also maintain, update, confirm, and audit information regarding the configuration items.

The CMDB records configuration items (CI) and details about the important attributes and relationships between CIs. As used herein, the term "configuration item" or "CI" refers to a resource that is subject to configuration management. Configuration items may include system resources such as hardware and software configuration items, equipment for providing IT services, documents such as regulation books, work procedures, and configuration diagrams. The configuration diagrams may relate to the operation of IT services, services such as maintenance information, processes, and human resources. Configuration managers usually describe CIs using three configurable attributes: technical, ownership, and relationship. The technical attributes are attributes that represent the configuration of the CI with regard to the functionalities, capabilites, physical configuration, connections, etc. of the particular hardware and/or software component that the CI represents. The ownership attributes define the configuration of the CI with regard to what elements own the hardware/software component that is represented by the CI, e.g., the organization, the particular computing devices on which the component is provided, and the like. The relationship attributes define the relationships between CIs. In some embodiments, a relationship may be defined by a data model. Some examples may include "assigns," "canConnect," "canUse," "connectAt," "connects," "controls," "deployedOn," "Located," "Managed," "provides," "runAt," "uses," and "usedBy."

The configuration items (CIs) are managed in an integrated fashion using a CMDB. As used herein, the term CMDB refers to a database that records at least one predetermined attribute of the configuration items and relations between the configuration items and other configuration items. By implementing the CMDB, a computer system managing the CMDB may accurately reflect information regarding the configuration items. Particularly, the computer system may automatically discover information regarding configuration items, a process referred to herein as "discovery" or "automatic detection," and may automatically update information regarding the configuration items, a process referred to herein as "tracking."

Service management software, such as "Tivoli™ Change and Configuration Management Database" or "Tivoli CCMDB," produced and owned by IBM Corporation, may assist in constructing a CMDB and controlling an operation process based on the CMDB. Such service management software may further execute CI discovery and tracking.

Specifically, service management software may identify configuration items in a distributed network environment, such as servers, clients, an operating system ("OS"), middleware (Web/AP/DBMS/LDAP), package software, management tools, network devices, storage devices, and the like. The service management software may automatically discover and update information regarding each configuration item, such as, for example, information regarding configurations of server and client computers, information regarding applications operating in each computer, information regarding configurations of a network attached storage ("NAS") and a printer connected to each computer, and information regarding configurations of a storage area network ("SAN") and a printer directly connected to a network.

Collecting information regarding each configuration item depends on management targets. Basically, a computer system that manages the CMDB may regularly access a management remote interface using Secure Shell ("ssh"), Simple Network Management Protocol ("SNMP"), Windows Management Instrumentation ("WMI"), or the like, and may read configuration files or configuration information of the OS. Alternatively, the computer system that manages the CMDB may execute a setting confirmation instruction. As a result, an agent program may not need to be introduced to the configuration items to be managed.

To collect configuration items and relations between the configuration items and other configuration items without introducing an agent program to the configuration items, application discovery software such as Tivoli™ Application Dependency Discovery Manager ("TADDM") may be used. The TADDM is one component of the CCMDB. Based on an information model suggested by IBM known as the Tivoli™ Common Data Model ("CDM"), the information discovered and updated by the application discovery software may be sorted into sections (such as a computer system, a database, an application, and a process), classes, attributes, interfaces, relationships, and data types. Information regarding configuration items (CIs) and relations between CIs may be transferred to a GUI display tool, such as, for example, a TADDM console. The CIs and the relations between CIs may be visually displayed on a display device using individual blocks and links between blocks.

Thus, the CI may comprise a set of data that includes at least one predetermined attribute of a configuration item and a relation that includes the configuration item. The set of data may include, for example, data indicating at least one predetermined attribute of a software configuration item and a relation between the software configuration item and another software configuration item or hardware configuration item. The CIs and relations between the CIs may be implemented by, for example, an instance of static data or an instance of a class of Java™.

An attribute in a CI may include, for example, a CI name (e.g., server, client, firewall), a serial number ID (e.g., a number, such as a serial number, for individually identifying a specific entity of a CI), a category (e.g., hardware, software, document), a type, a model number, a warranty period, a version number, a location (e.g., a place where a PC is placed, a library of software, a place where a medium is stored, a site providing a service), a responsible person name, a responsibility start date (e.g., a date when the responsible person is responsible for the CI), a provider name, license information, a provided date (e.g., a date when the CI is provided to an organization), a received date (e.g., a date when the CI is received by the organization), a usage start date (e.g., a date when the use of the CI is started), a status (e.g., operating, testing, out of order, or a future or planned CI status), and a status of an CI instance (e.g., active or inactive), or any of a plethora of other types of attributes. The CI preferably is comprised of attribute-value pairs where predefined attributes are set forth in a CI model and the particular values paired with these attributes define a specific instance of the CI model.

Figure 3:
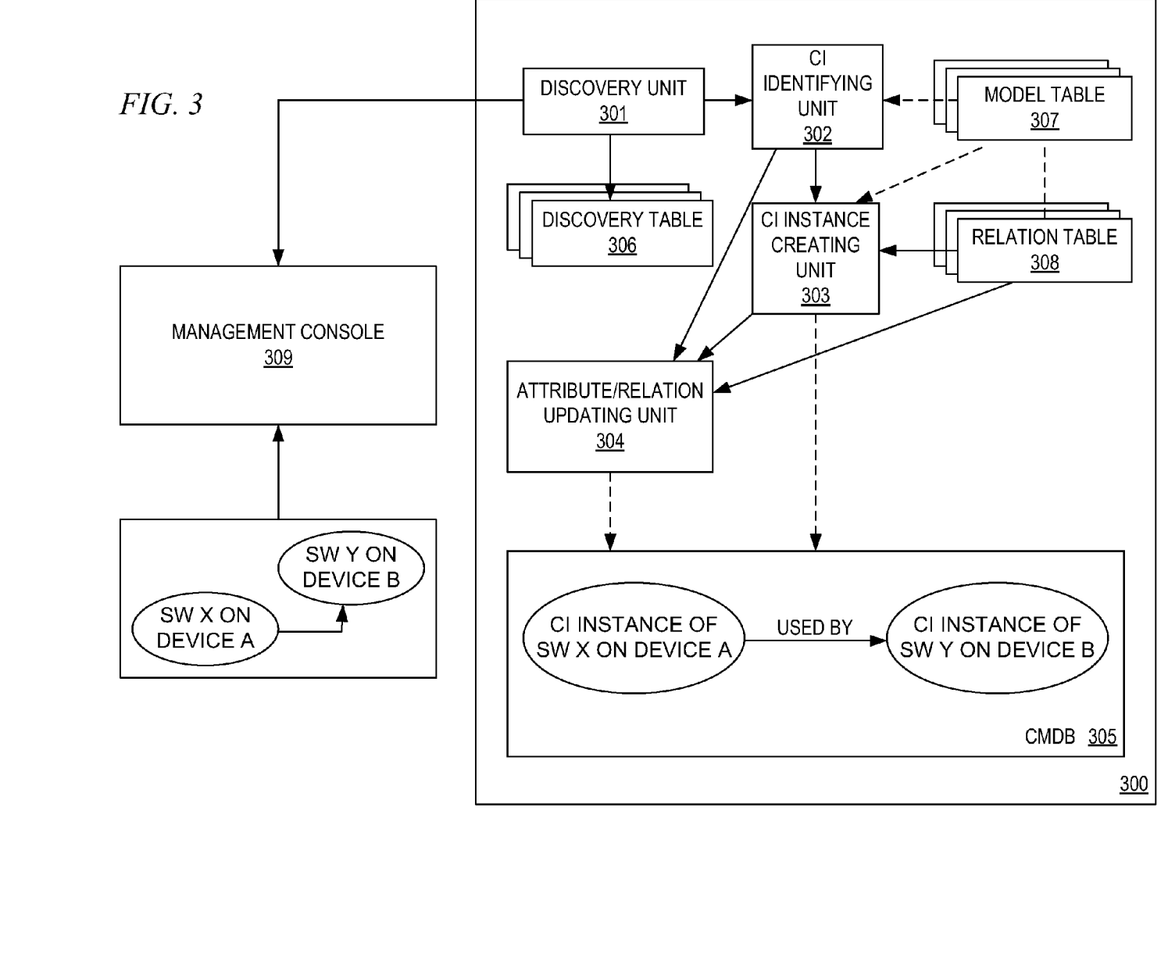
FIG. 3 is an example diagram of a CMDB containing computer system that may manage a plurality of CIs in accordance with one illustrative embodiment.

Referring now to FIG. 3, an example diagram of a CMDB containing computer system that may manage a plurality of CIs in accordance with one illustrative embodiment is shown. As shown in FIG. 3, a CMDB containing computer system 300 may manage a plurality of CIs representing resources of an IT environment, such as the IT environment illustrated as data processing system 100 in FIG. 1, for example. FIG. 3 shows software (hereinafter, abbreviated as "SW") X of a device A and SW Y of a device B as examples of CIs. The computer system 300 may include a discovery unit 301, a CI identifying unit 302, a CI instance creating unit 303, an attribute and relation updating unit 304, and a CMDB 305. The discovery unit 301, the CI identifying unit 302, the CI instance creating unit 303, the attribute and relation updating unit 304, and the CMDB 305 may be implemented in a single computer, or may be implemented in a plurality of computers in a distributed manner. The computer system 300 may further include a discovery table 306, a model table 307, and a relation table 308. These tables may be implemented in a storage device of a single computer, or may be implemented in storage devices of a plurality of computers in a distributed manner.

A management console 309 may be used to display CIs and connection relations between the CIs. An example of the management console 309 may be, for example, a TADDM console or the like. The CIs and the connection relations between the CIs displayed in a topology dependency screen on the management console 309 are provided as an example only. One skilled in the art will recognize that not all management-target CIs and connection relations between CIs of the data processing system, such as data processing system 100 in FIG. 1, are displayed in the depicted example and additional CIs and relations between CIs may be provided in such a displayed topology dependency screen on the management console 309 without departing from the spirit and scope of the illustrative embodiments.

The discovery unit 301 may execute detection or discovery of information regarding a management-target CI of the CMDB. The computer system 300 may include a plurality of discovery units 301. In one embodiment, the management target may be connected to the computer system 300 via a wired or wireless network.

A system administrator or other authorized user of the computer system 300 may freely set the detection target. A detection range may be specified using, for example, a domain name, an IP address, a MAC address, a device identifier, a database name, or combinations thereof. When the CI to be managed is, for example, an industrial device, the information regarding the industrial device may be detected. The detected information may be information regarding a new CI, or a value of an updated attribute or relation regarding an existing CI.

A new CI may be a CI that is detected by the discovery unit 301, but is not registered in the CMDB 305. An existing CI may be a CI whose CI instance has already been registered in the CMDB 305.

The discovery unit 301 may detect the information regarding the CI according to discovery information (e.g., X-Discovery) stored in the discovery table 306. The discovery information to be used may be specified in a discovery method of a data model, for example. The discovery unit 301 may transfer the detected information regarding the CI to the CI identifying unit 302.

The CI identifying unit 302 may receive the information regarding the CI from the discovery unit 301 and may perform processing on the detection result. The CI identifying unit 302 may determine, with reference to the CMDB, whether the information regarding the CI is information regarding a new CI, or a value of an updated attribute or relation of an existing CI 305. This determination may be performed by comparing an instance name of the CI stored in the CMDB with information regarding the CI, for example.

Upon determining that the information regarding the CI is information regarding a new CI, the CI identifying unit 302 may transfer the information to the CI instance creating unit 303. Upon identifying that the information regarding the CI is a value of an updated attribute or relation of an existing CI, on the other hand, the CI identifying unit 302 may transfer the information to the attribute and relation updating unit 304.

The CI instance creating unit 303 may create a set of data, including a predetermined attribute of the CI and a relation between the CI and another CI, from corresponding information in the data model and a relation model. The data model may be stored in the model table 307, and the relation model may be stored in the relation table 308. The set of data may be instantiated based on corresponding information detected by the discovery unit 301, or manually input information regarding the CI. In one embodiment, for example, the set of data may be implemented by an instance of static data and an instance of a class of Java™. An example of the set of data may include a CI instance.

Figure 4:
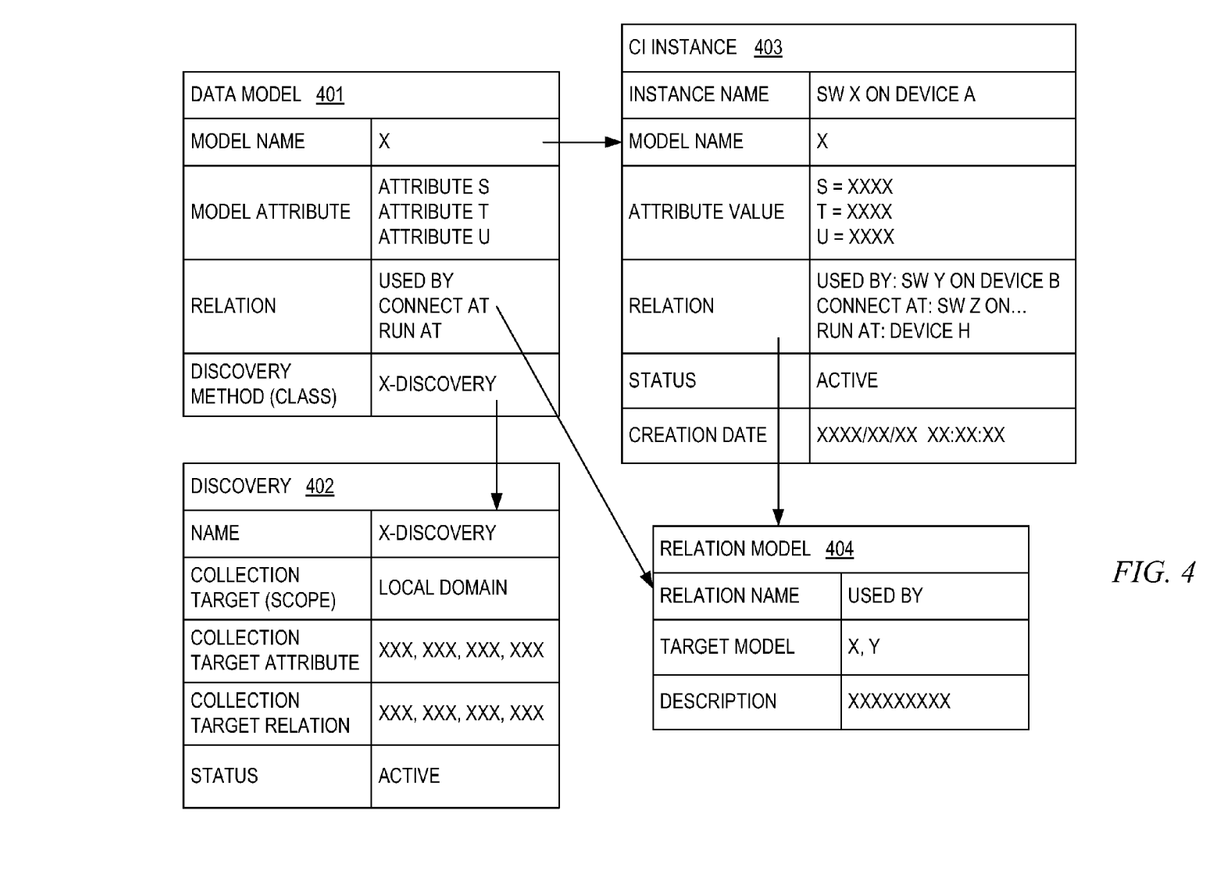
FIG. 4 is an example diagram of a CI instance in accordance with one illustrative embodiment.

FIG. 4 depicts an example of a CI instance 403. The set of data may be stored in the CMDB 305. In addition, the set of data may include an attribute and a relation in the CI instance 403. Alternatively, an attribute may be stored in the CI instance, and a relation instance may be stored separately in the CMDB 305. In this case, the CI instance may include a link for identifying an associated relation instance.

The attribute and relation updating unit 304 may realize tracking in cooperation with the discovery unit 301. The attribute and relation updating unit 304 may reflect the value of the updated attribute or relation of the CI in the CI instance stored in the CMDB. More specifically, the attribute and relation updating unit 304 may update the value of the attribute or relation of the CI instance. The update may be performed by replacing the values with the information regarding the CI detected by the discovery unit 301. Specifically, all values of the attribute or relation of the CI instance may be replaced with the information regarding the CI detected by the discovery unit 301, or only different values may be replaced. The CMDB 305 may record the CI instances 403.

The discovery table 306 may store the discovery information 402. This discovery information may be used when the discovery unit 301 detects the CI information. The discovery information 402 may be implemented by an instance of static data or an instance of a class of Java™, for example. The discovery information may also be referred to as a discovery policy.

The discovery information 402 may include a range searched by the discovery unit 301, namely, a collection target (scope) that is a CI search range, an attribute to be collected, and a relation to be collected. The collection target may be specified by using, for example, a subnet IP address, a range of IP addresses, individual IP addresses, MAC addresses, device identifiers, host names, database names, or combinations thereof. In other embodiments, the collection target may be specified as a schedule management database connected to the computer system 300 via a network. The schedule management database may store, for example, data regarding management of processes using devices. In still other embodiments, the collection target may be specified as a database storing a batch processing definition file. When the collection target is the database storing the batch processing definition file, the discovery unit 301 may load the content of the batch processing definition file to perform detection. The batch processing definition file may store, for example, data describing the order of using devices.

In some embodiments, the model table 307 may store the data model 401. The data model 401 may be used when the CI instance creating unit 303 creates a set of data indicating a predetermined attribute of the CI and a relation between CIs.

The relation table 308 may store the relation model 404. The relation model may be used when the CI instance creating unit 303 creates a set of data indicating a predetermined attribute of the CI and the relation between the CIs.

As shown in FIG. 3, the discovery unit 301 may detect information regarding management-target software connected to the computer system 300 via a network. In one embodiment, for example, the discovery unit 301 may detect information regarding software (SW) X of device A, in the IT environment of the distributed data processing system 100 in FIG. 1, for example, and information regarding SW Y of device B of distributed data processing system 100 in FIG. 1, where device B uses device A. For example, SW X may be an Application Server running on device A which uses SW Y which may be a User Directory/LDAP server application/service running on device B.

The CI identifying unit 302 may determine, with reference to the CMDB 305, whether the detected information is information regarding a new CI. Based on this determination, the CI instance creating unit 303 may create a CI instance of SW X of device A, a CI instance of SW Y of device B, and an instance of a relation ("usedBy") between those CI instances. Each detected instance may then be stored in the CMDB 305. As shown in FIG. 3, for example, the CI instance of SW Y of device B may be stored in a "usedBy" relation with the CI instance of SW X of device A.

Although SW X of device A and SW Y of device B have been described herein as examples of software based CIs, one skilled in the art will recognize that the present invention is equally applicable to a case where SW Y of device B is replaced by a hardware CI. In short, the discovery unit 301 may create CIs and relations between CIs according to the data model 401 and based on the detected information regarding the CI. The CIs and relations may then be registered in the CMDB 305. Particularly, the CMDB 305 may store an attribute of the CI and relations between the CI and other CIs. Accordingly, a system administrator may be able to extract a real dependency between the CIs using the CMDB 305.

In accordance with the illustrative embodiments, the CMDB, such as CMDB 305 for example, provides information related to the discovered components of an information technology system, such as distributed data processing system 100 in FIG. 1, to a user account policy generator. The user account policy generator maps this information to a user account policy template in order to automatically generate a user account policy. The user account policy may then be utilized to create user accounts for the particular resources of the distributed data processing system 100 for which the user account policy is automatically generated.

For example, templates may be generated, in accordance with the illustrative embodiments, for a plurality of components including an electronic mail application, a patent database system, an employee directory application, and the like. The CMDB 305 may store information for a "Patent Business Application" which includes the dependencies between this software resource and other software/hardware resources. For example, the CMDB 305 may indicate that the "Patent Business Application" depends on an electronic mail application A, a patent database B, and an employee directory application C. The mechanisms of the illustrative embodiments, when a user account policy is to be generated for the "Patent Business Application" may automatically retrieve the templates associated with the dependencies of the Patent Business Application and use them to generate a user account policy for the Patent Business Application. For example, the mechanisms of the illustrative embodiments may retrieve the templates for the electronic mail application, the patent database system, and the employee directory application, and use those templates, along with configuration information from CI instances associated with the dependent resources, to generate a user account policy. This process is described in more detail hereafter.

Figure 5:
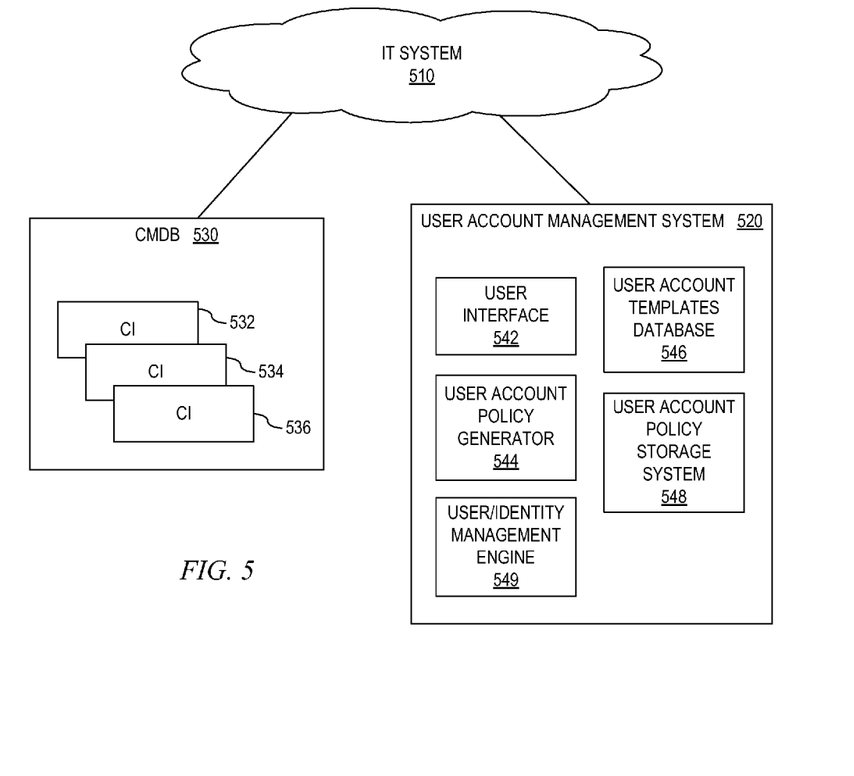
FIG. 5 is an example block diagram of the primary operational elements of one illustrative embodiment for automatically generating user account policies.

FIG. 5 is an example block diagram of the primary operational elements of one illustrative embodiment for automatically generating user account policies. As shown in FIG. 5, the primary operation elements comprise an information technology (IT) system 510, an account management system 520 and a CMDB 530. The IT system 510 is comprised of a plurality of hardware and/or software components. An example of IT System 510 may be a composite application which runs on an application server which in turn depends on an LDAP server service. Such an IT system 510 may be provided as, or as part of, the distributed data processing system 100 in FIG. 1, for example. Other types of IT systems having various configurations may be used with the mechanisms of the illustrative embodiments without departing from the spirit and scope of the illustrative embodiments.

The CMDB 530 discovers IT resources, hardware and/or software resources, in the IT system 510 and generates configuration instances (CIs) 532-536 to represent configurations of these IT resources, such as in a manner as previously described above with regard to FIGS. 3-4, for example. It should be appreciated that while FIGS. 3-4 are provided as an example CMDB system that may be used with the mechanisms of the illustrative embodiments, the illustrative embodiments are not limited to such and any CMDB or other configuration information database system may be used without departing from the spirit and scope of the illustrative embodiments.

The user account management system 540 comprises a user interface 542, a user account policy generator 544, a user account templates database 546, a user account policy storage system 548, and a user/identity management engine 549. The elements of the user account management system 540 may be implemented in hardware, software, or any combination of hardware and software. In one illustrative embodiment, the elements of the user account management system 540 are implemented as software instructions executed by one or more processors of one or more data processing systems.

The user interface 542 provides an input/output mechanism through which a system administrator, or other authorized user, can provide input and receive output from the user account management system 540. Via this user interface 542, the system administrator may trigger the user account policy generation by the user account policy generator 544. In addition, this user interface 542 may be used to present the generated user account policy to the system administrator and receive input from the system administrator to finalize the generated user account policy and submit it to the user/identity management engine 549.

The system administrator may trigger the user account policy generation, for example, by specifying an IT resource/CI for which the system administrator wishes to create user account policies. For example, the system administrator may select the IT resource from a list of IT resources, input a designation of the IT resource, or may identify the IT resource in any other suitable manner depending on the particular implementation. The IT resource may be any hardware resource or component, software resource or component, or combination of hardware resource or component and software resource or component. In some illustrative embodiments, the IT resource may be a combination of multiple software, multiple hardware, or a combination of multiple hardware and multiple software resources/components.

The user account policy generator 544 accesses the CMDB 530, in response to the system administrator inputting a request to generate a user account policy for an IT resource in the IT system 510, to obtain the IT resource's CMDB items from corresponding CIs 532-536. That is, the user account policy generator 544 retrieves the CIs for the IT resource and its related IT resources as specified in the relationship attributes of the CI for the IT resource. In addition, the user account policy generator 544 retrieves the user account policy template(s) for the specified IT resource and its dependent resources from the user account policy template database 546. For example, based on an identifier of the IT resource, the CI for the IT resource may be obtained which may specify a type of the resource in one of its attribute-value pairs. Based on this type, one or more user account policy template(s) corresponding to this type of IT resource may be retrieved from the user account policy template database 546.

The user account policy templates in the user account policy template database 546 include such information as the password policy and password synchronization mechanism, an access control model to be used (role based, discretionary, mandatory, etc.), access provisioning model (role based, request based, etc.), user account and access request workflows, and the like. The user account templates may further include access type information which specifies a classification of the kind of access that users need for the given IT resource, e.g., IT resource access, intranet web application access, shared folder access, membership in an email group, or the like.

The user account policy generator 544 maps the configuration information from the CIs 532-536 retrieved from the CMDB 530 to the user account templates. That is, the attribute-value pairs specified in the CIs 532-536 are mapped to corresponding attributes in the user account templates. The resulting user account policy generated by the user account policy generator 544 may be provided, via the user interface 542, to the system administrator, for example, so that the system administrator may edit the user account policy in order to finalize it. Alternatively, the generated user account policy may be directly stored in the user account policy storage system 548 in correspondence with an identifier of the IT resource. For example, if the user account policy generator 544 determines that not all attributes of the template have mapped values from the CIs 532-536 retrieved from the CMDB 530, then the user account policy generator 544 may display the generated user account policy for editing by the system administrator, or other authorized user. If the user account policy generator 544 determines that no additional editing is required by a system administrator or authorized user, then the generated user account policy may be stored to the user account policy storage system 548. Even in the case where no further editing is determined to be necessary, the user account policy may still be displayed to the system administrator for editing and/or confirmation if desired.

When user accounts are to be generated for accessing the IT resource, the corresponding user account policy may be retrieved from the user account policy storage system 548. The user/identity management engine 549 may utilize the retrieved user account policy to provision the new user accounts. The user account policies in the user account policy storage system 548 are preferably, although this is not required, specified in a user account product independent format, e.g., a generic XML format which then can optionally be converted to a specific format for a specific user/identify manager engine 549 (e.g., Tivoli™ Identity Manager).

Figure 6:
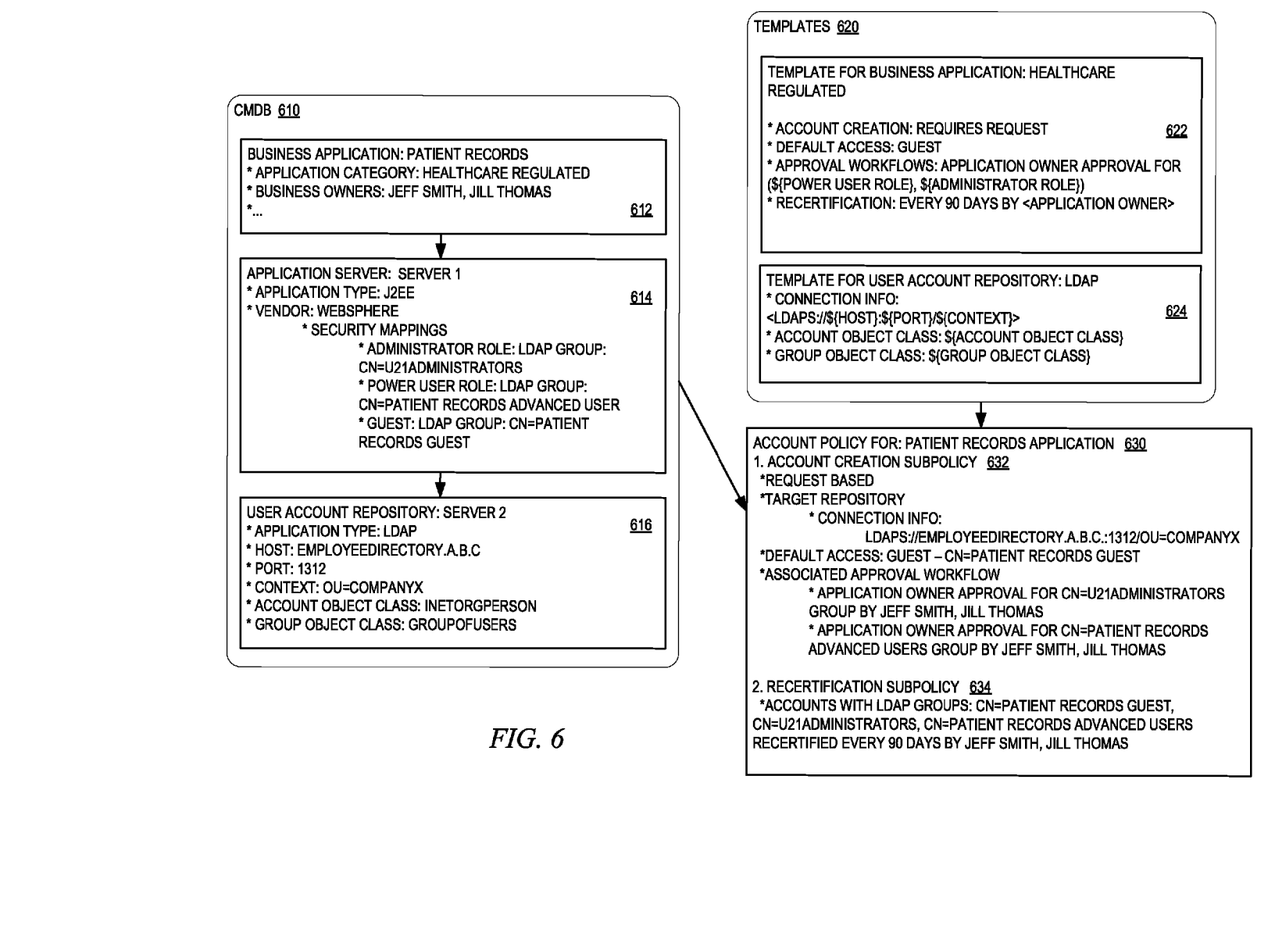
FIG. 6 is a diagram illustrating one example of the generation of a user account policy based on CIs of a CMDB and user account policy templates in accordance with one illustrative embodiment.

FIG. 6 is a diagram illustrating one example of the generation of a user account policy based on CIs of a CMDB and user account policy templates in accordance with one illustrative embodiment. As shown in FIG. 6, the CMDB 610 comprises a plurality of CIs 612-616 for defining the configuration information for a plurality of resources of an IT environment (not shown). In the depicted example, the CIs 612-616 represent a business application (612) referred to as "Patient Records", an application server (614), and a user account repository (616). The arrows between the CIs 612-616 represent information in the CIs 612-616 specifying dependencies between the resources represented by the CIs 612-616. For example, the business application "Patient Records" (612) is dependent upon the Application Server (614) which in turn is dependent upon the User Account Repository (616).

Each of the CIs is defined in terms of one or more attribute-value pairs in the depicted example. For example, the CI 612 for the business application "Patient Records" has attribute-value pairs of application category: Healthcare Regulated, Business owners: Jeff Smith, Jill Thomas, and the like.

The template database 620 comprises one or more templates 622, 624 for defining a user account policy for provisioning user accounts for one or more of the resource types of the IT environment represented by the CIs 612-616 in the CMDB 610. In the depicted example, the template database 620 comprises two templates 622, 624, one being a template for generating user account policies associated with the business application of type "Healthcare Regulated" (622), and another being a template for generating user account policies for a User Account Repository of type LDAP (624). Various attribute-value pairs are provided in the templates 622, 624 for specifying user account policy rules to be implemented when generating a user account policy. Moreover attribute-value pairs may be provided in the templates 622, 624 to specify the information that is to be obtained from corresponding CIs 612-616 in the CMDB 610 in order to generate a user account policy for the corresponding resource. For example, for the template of the business application "Healthcare Regulated" (622), the template specifies that the account creation is "request based" (i.e. user accounts are created only in response to a request), the default access to the user accounts is "guest", user account creation requires application owner approval for generating power user or administrator user accounts, and that recertification of the user accounts is required every 90 days.

In response to a request, a detection of a change in the CMDB 610, a change to one or more of the CIs 612-616, a change to the templates 622, 624 in the templates database 620, or the like, the information in the templates 622, 624 are used with the information stored in the CIs 612-616 to generate a user account policy for a patients records application 630. The Account Policy for Patients Records application 630 comprises one or more sub-policies 632, 634 for specifying rules for various operations associated with user accounts, i.e. user account creation sub-policy 632 and recertification sub-policy 634. These sub-policies 632, 634 may be created by mapping the configuration information in CIs 612-616 to the templates 622 and 624 in accordance with the dependencies specified in the CIs 612-616. It should be noted that more than one template 622, 624 of the template database 620 may be combined together to generate the user account policy 630. Which templates 622, 624 to combine together to generate a user account policy 630 may be determined based on, for example, the dependency information maintained in the CIs 612-616 of the CMDB 610.

For example, in the depicted example, the account creation sub-policy 632 includes rules obtained from the templates 622, 624 which are populated with information obtained from the CIs 612-616. One rule in the depicted example is that the account creation sub-policy 632 specifies account creation to be request based, as specified in the template 622. Another rule specifies the target repository of the user account creation to be the LDAP server whose connection information is Ldaps://employeedirectory.a.b.c.:1312/ou=CompanyX. It should be noted that this connection information is obtained from the CI 616 describing the user account repository resource of the IT environment mapped to the template 624.

A third rule in the depicted example is that the default access of created user accounts is a guest access, i.e. cn=PatientRecordsGuest. The default access to be used is specified in template 622, but the value for the default access is obtained from the CI 614 for the application server resource of the IT environment.

A fourth rule of the account creation sub-policy 632 is that workflow approval associated with power users roles and administrator roles is limited to only the owners of the company, as specified in the template 622. The actual values for the power user role and administrator role are obtained from the CI 614 for the application server and the values for the owners are obtained from the CI 612 for the business application.

With regard to the recertification sub-policy 634, the rule for recertification being every 90 days and being performed by the application owners is obtained from the template 622 mapped to information obtained from the CI 612 regarding the application owners and information obtained from the CI 614 regarding the accounts with LDAP groups that require recertification. Thus, in the depicted example, user accounts with administrator roles (cn=u21Administrators), power user roles (cn=PatientRecordsAdvancedUsers), and guest roles (cn=PatientRecordsGuest), must be recertified every 90 days by either Jeff Smith or Jill Thomas.

Using the mechanisms of the illustrative embodiments, user account policies may be automatically generated by the user account policy generator based on a request from a system administrator and information previously discovered by the CMDB. For example, assume that a Patient Records business application is discovered and uploaded into the CMDB with its configuration and dependencies specified in one or more CIs in the CMDB. The CMDB thus contains the CIs to represent the Patient Records application and its sub-components, e.g., Application Server on machine A, User Directory (LDAP) Server on machine B, Database on machine C, and their dependencies or relationships. In addition, these CIs may contain detailed information regarding their security settings and configuration, such as the connection information to the LDAP Server, LDAP schema, and the like.

Based on the detailed configuration information and the relationships between the components specified in the CIs, the user account policy generator 544 selects the appropriate user account policy template(s) that apply for each component and sub-component of the Patient Records application and instantiates a complete user account policy by mapping the CMDB's CI data into the user account template(s). Potential gaps between resources discovered and additional information needed for the user account policies are exposed at the user interface which enables the system administrator or other authorized user to confirm and update any additional details of the user account policies.

As a result of the implementation of the illustrative embodiments described herein, formal user account templates, which represent the best practices for user account generation, are automatically mapped to real discovered data representing the actual configurations of IT resources in an IT system. This may be done based on the type of IT resource for which a user account policy is to be generated, i.e. user account templates are paired with IT resources based on IT resource type. The mechanisms of the illustrative embodiments provide such automatic generation of user account policies based on already discovered configuration information, thereby avoiding redundant and out of synchronization configurations. Such user account policies may be generated dynamically with little additional overhead or cost for setting up and configuring user account environments.

It should be appreciated that the mechanisms of the illustrative embodiments may be automatically initiated in a feedback manner when changes to an IT system are discovered by the CMDB system 530, for example. That is, as discussed above, the CMDB system 530 performs discovery operations. When the CMDB system 530 detects a change in configuration of an existing component of the IT system, e.g. system 510 in FIG. 5, if a component is removed from the IT system, or if a new component is added to the IT system, the CMDB system 530 may signal such changes to the user account management system 540. This indication of a change in configuration of the IT system may designate a particular IT resource whose configuration has changed and this identification may be used as a way to initiate the operation of the illustrative embodiments as described above. Thus, rather than having to have a system administrator or other user initiate the operation of the illustrative embodiments, the initiation may be performed automatically in response to configuration changes in the IT system detected by a CMDB or other configuration management mechanism. This process may be repeated in a feedback manner such that with each new configuration change made to the IT system, corresponding user account policies are updated by mapping the new configuration to corresponding user account policy templates. In some illustrative embodiments, administrators may be notified to propagate the changes into the IT System user accounts.

Figure 7:
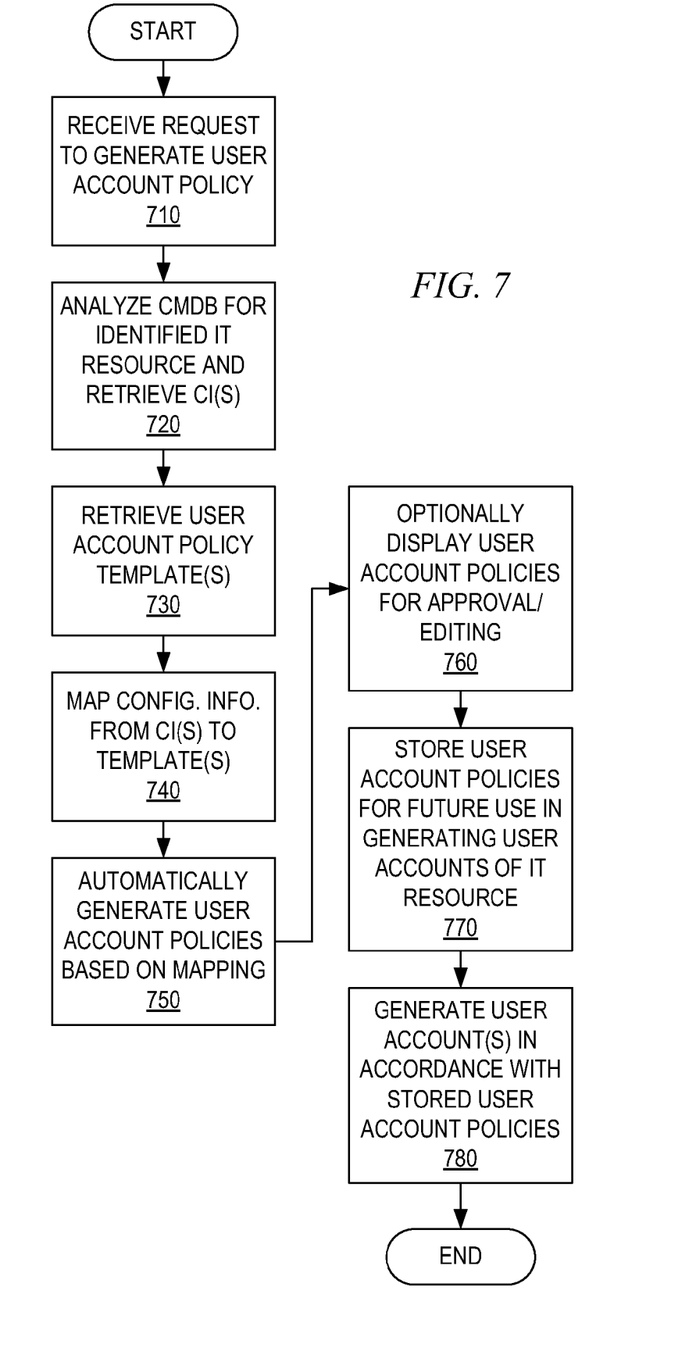
FIG. 7 is an example flowchart outlining an example operation for performing automatic user account policy generation in accordance with one illustrative embodiment.

FIG. 7 is an example flowchart outlining an example operation for performing automatic user account policy generation in accordance with one illustrative embodiment. As shown in FIG. 7, the operation starts with a request being received to generate a user account policy (step 710). As mentioned above, this request may be generated in response to a user input requesting user account policy generation for a particular IT resource, or may be automatically generated in response to a detected change in configuration of an IT resource or the IT system. For example, with a manually generated request, the CMDB may be queried to determine which IT resources are available for analysis and a listing of these IT resources may be presented to the system administrator. The system administrator may then select an IT resource from the listing for which the system administrator wishes to generate a user account policy.

In response to receiving this request, the CMDB is analyzed for the identified IT resource, either manually selected by a system administrator or automatically identified due to a detected configuration change, and the CIs for IT resource, its components, and all of its sub-components are retrieved (step 720). This CI information includes configuration information for the components and sub-compoennts as well as relationship or dependency information for the components and sub-components.

Based on the dependencies of the components/sub-components and their relationships, one or more user account policy template(s) corresponding to the types of components/sub-components are selected to be instantiated (step 730). The configuration information from the CIs is then mapped to the selected user account policy template(s) (step 740). A set of user account policies is automatically generated for the IT resource based on the mapping (step 750). Optionally, the user account policies may be displayed to an administrator or other authorized user for approval and/or editing so that the user account policies may be finalized (step 760). The user account policies may then be stored in a database (step 770) for later retrieval and use, such as by user/identity management engine 549, for example, when provisioning user accounts for the specified IT resource (step 780). The operation then terminates.

Thus, the illustrative embodiments provide mechanisms for automatically generating user account policies based on existing configuration information in a configuration management database (CMDB). The illustrative embodiments automatically map configuration information from the CMDB for specified IT resource(s) into pre-defined user account policy templates so that corresponding user account policy for the IT resource may be automatically generated and used to control user account provisioning. The user account policy generation takes into account the configuration information of the specified IT resource as well as any dependencies and relationships between the IT resource and other IT resources, as defined in the CIs of the CMDB. This permits user account policy generation with little overhead and which avoids redundant IT resource discovery operations since these operations have already been performed by the CMDB.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating user account policies for generating user accounts to access resources of a data processing system, comprising:

determining that a user account policy for an identified resource in the data processing system is to be generated;

retrieving configuration information associated with the identified resource from a configuration information database;

retrieving a predefined user account policy template from a user account policy template database system, wherein the predefined user account policy template is a template data structure with generic user account information for the identified resource; and generating a user account policy data structure based on the retrieved configuration information and the retrieved predefined user account policy template by combining a plurality of predefined user account policy templates in the predefined user account policy template, and corresponding configuration data from the retrieved configuration information, to generate a single user account policy data structure, wherein the plurality of predefined user account policy templates are selected in accordance with dependency information, in the configuration information, specifying a dependency of resources upon one another in the data processing system, wherein the user account policy data structure is a data structure identifying a manner by which user accounts for an application are to be created and maintained, and wherein a user account is a data structure that stores information in a user registry for giving a user access to the application.

2. The method of claim 1, wherein determining that a user account policy for the identified resource in the data processing system is to be generated comprises automatically detecting a change in configuration information for one or more resources of the data processing system, wherein the automatic detection of the change is an automatic detection of a changed configuration item being present in a configuration management database, and wherein the user account policy data structure is generated based on the changed configuration item and one or more user account policy templates corresponding to a resource associated with the changed configuration item.

3. The method of claim 1, wherein determining that a user account policy for the identified resource in the data processing system is to be generated comprises receiving a user request to generate a user account policy for the identified resource.

4. The method of claim 1, wherein the configuration information comprises dependency information identifying a dependency of a first resource on a second resource in the data processing system.

5. The method of claim 1, wherein generating a user account policy data structure comprises mapping values in the retrieved configuration information to one or more rules specified in the retrieved predefined user account policy template to generate the user account policy data structure.

6. The method of claim 5, wherein the configuration information comprises one or more attribute names and one or more corresponding values, the one or more rules of the predefined user account policy template specifying an attribute name of the one or more attribute names, and wherein mapping comprises mapping the one or more corresponding values in the configuration information to the one or more rules based on the attribute name in the predefined user account policy template and the one or more attribute names in the configuration information.

7. The method of claim 1, further comprising:
deploying the user account policy data structure in a user account management system; and
provisioning, by the user account management system, user accounts in accordance with user account policies specified in the user account policy data structure.

8. The method of claim 1, wherein each of the plurality of predefined user account policy templates are templates for generating user account policies for different types of resources in the data processing system.

9. The method of claim 1, further comprising displaying the user account policy data structure to a user via a display device and an approval or editing interface.

10. The method of claim 1, wherein the user account policy template comprises information identifying at least one of a password policy, password synchronization mechanism, or a classification of a type of access that users need in order to access the identified resource.

11. The method of claim 1, further comprising:
generating, for a user, a user account for accessing the identified resource by applying the user account policy data structure to define the user account.

* * * * *